United States Patent [19]

Kawano et al.

[11] Patent Number: 5,051,976
[45] Date of Patent: Sep. 24, 1991

[54] DISK RECORDING AND REPRODUCING APPARATUS WITH SPEED COMPENSATION FOR CAV AND CLV DISKS IN ACCORDANCE WITH SIGNALS RECORDED ON THE DISKS

[75] Inventors: Eisaku Kawano; Masahiro Nakajima, both of Saitama, Japan

[73] Assignee: Pioneer Electronic Corporation, Tokyo, Japan

[21] Appl. No.: 190,853

[22] Filed: May 6, 1988

[30] Foreign Application Priority Data

May 15, 1987 [JP] Japan ................................ 62-118538

[51] Int. Cl.⁵ .......................... H04N 5/92; G11B 19/28
[52] U.S. Cl. ........................................ 369/50; 358/342; 360/73.03; 369/58
[58] Field of Search ................. 360/70, 73.03; 369/50, 369/54, 58, 189, 239; 358/338, 342, 320, 330

[56] References Cited

U.S. PATENT DOCUMENTS

| | | | |
|---|---|---|---|
| 3,936,867 | 2/1976 | Thuy et al. ........................ | 358/330 |
| 4,338,683 | 7/1982 | Furukawa et al. ................. | 369/50 |
| 4,423,498 | 12/1983 | Kimura et al. .................... | 369/50 X |
| 4,439,849 | 3/1984 | Nabeshima ........................ | 369/50 |
| 4,575,835 | 3/1986 | Nishikawa et al. ................ | 369/50 |
| 4,723,235 | 2/1988 | Yasuda et al. ..................... | 369/50 |
| 4,733,311 | 3/1988 | Yoshinaka ......................... | 358/320 |
| 4,758,903 | 7/1988 | Noguchi et al. ................... | 358/330 X |
| 4,761,692 | 8/1988 | Yoshida et al. .................... | 369/50 X |
| 4,772,950 | 9/1988 | Furuhata et al. .................. | 358/320 X |
| 4,855,978 | 8/1989 | Kanamaru ......................... | 369/50 X |

Primary Examiner—Roy N. Envall, Jr.
Assistant Examiner—W. R. Young
Attorney, Agent, or Firm—Sughrue, Mion, Zinn Macpeak & Seas

[57] ABSTRACT

For a disk recording and/or reproducing apparatus which may use either constant angular velocity or constant linear velocity disks, speed compensation circuitry is provided which operates in accordance with RF signal information recorded on a surface of a disk. Irrespective of the nature of the disk being used (CAV or CLV), comparison circuitry within the apparatus provides reliable speed detection and compensation.

6 Claims, 2 Drawing Sheets

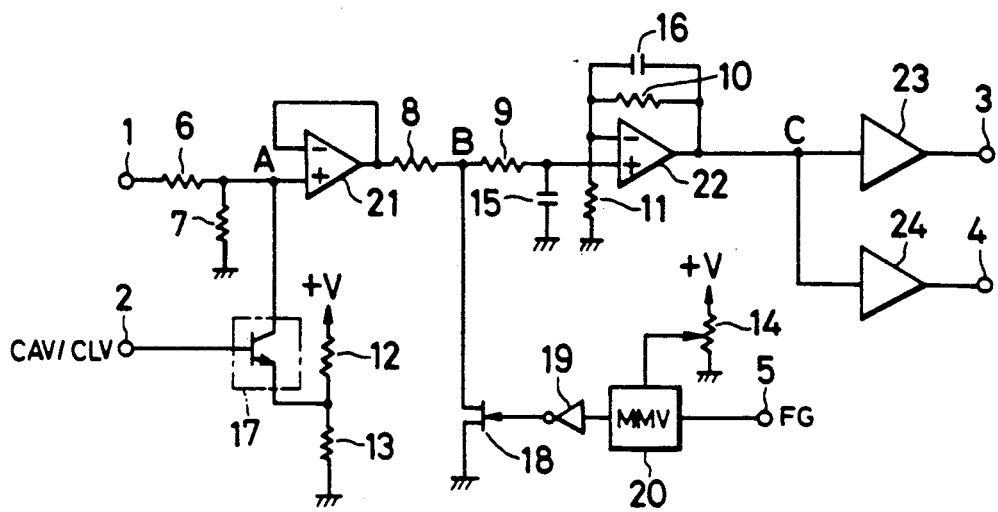

DISK RECORDING AND REPRODUCING APPARATUS WITH SPEED COMPENSATION FOR CAV AND CLV DISKS IN ACCORDANCE WITH SIGNALS RECORDED ON THE DISKS

BACKGROUND OF THE INVENTION

The present invention relates to a disk recording and/or reproducing apparatus, such as a video disk player, compact disk player, optical disk apparatus, or the like. More particularly, the invention relates to such an apparatus in which a spindle motor for rotating a disk is accelerated or decelerated so as to keep the number of rotations (rotational speed) of the disk within a predetermined range.

FIG. 1 is a block diagram showing circuitry in a conventional video disk player in which a disk may be rotated at a constant angular velocity (CAV) or a constant linear velocity (CLV). When a CAV disk is being used, a high level signal is applied to a terminal 2 and an NPN transistor 17 is turned on accordingly. A non-inverting input terminal A of an amplifier circuit 21 is clamped to a potential determined by a voltage V and resistance values of resistors 12 and 13, and a predetermined constant voltage is outputted from the amplifier circuit 21, which includes an operational amplifier. A frequency generator (not shown) is attached to a spindle motor not shown) which rotates the video disk, and an FG (frequency generator) pulse outputted from the frequency generator is applied to a terminal 5. A monostable multivibrator (MMV) 20 is triggered by the FG pulses and outputs pulses having a duration adjusted and determined by a variable resistor 14. The output of the multivibrator 20 is inverted by an inverter 19 and the resultant pulses are applied to an FET 18. The FET 18 is turned off while the output pulses from the inverter 19 are supplied. As a result, a potential at the junction point between resistors 8 and g is held at a high level while the MMV 20 supplies the pulses, and at a low level during the remaining period of time.

Assuming the potential at point B changes as shown in FIG. 2A when the rotational speed of the CAV disk coincides with a reference value, the potential at the point B changes, as shown in FIG. 2B, so that the duration of the low level value is extended when the rotational speed is lower than a reference value. On the other hand, when the rotational speed thereof is higher than the reference value, the potential at the point B changes, as shown in FIG. 2C. so that the duration of the low level value is shortened.

The signal at point B is integrated by an integration circuit comprised of resistors 9. 10 and 11, capacitors 15 and 16, and an operational amplifier 22. Accordingly, the potential at a point C becomes low when the rotational speed of the CAV disk is relatively low, and becomes high when the rotational speed thereof is relatively high.

The potential at the output terminal of the integration circuit is compared with reference voltages in comparison circuits 23 and 24. The comparison circuit 23 outputs a first output signal at a terminal 3 when the potential at the point C is lower than a first reference voltage, while the comparison circuit 24 outputs a second output signal at terminal 4 when the potential at the point C is higher than a second reference voltage where the second reference voltage is higher than the first reference voltage. The spindle motor is accelerated in response to the first output signal outputted from the comparison circuit 23, and decelerated in response to the second output signal outputted from the comparison 24. In this manner, the spindle motor is either accelerated or decelerated in response to the outputs from the comparison circuits 23 and 24 so that the rotational speed of the disk is maintained within a predetermined range. When the rotational speed of the spindle or the disk falls within the predetermined range, a spindle servo loop is turned ON.

When a CLV disk is being used, the transistor 17 is rendered OFF. so that the potential at the point A is set to a value obtained by dividing the potential of an input signal supplied to a terminal 1 by a ratio of the resistance values of resistors 6 and 7. A signal whose level changes in accordance with the radial position of a pickup (not shown) is applied to the terminal 1. The level of the signal at the terminal 1 may be changed, for example, in accordance with an output supplied from a potentiometer (not shown). When the pickup is positioned in an inner circumferential portion, the potential at the point B is lowered as shown in FIGS. 3A through 3C. whereas when the pickup is positioned in an outer circumferential portion the potential at point B is- made higher as shown in FIGS. 4A through 4C. Wherever the pickup may be positioned, the duration of the low level is extended when the disk is rotating at a slower speed (see FIGS. 3B and 4B) than the reference speed (see FIGS. 3A and 4A). On the other hand, when the disk is rotating at a higher speed (see FIGS. 3C and 4C). the duration of the low level is shortened. Therefore, the CLV disk also can be rotated at a linear velocity within a predetermined range, as is done for the CAV disks.

Because a conventional disk reproducing apparatus controls spindle motor rotation by means of FG pulses generated from a frequency generator attached to the spindle motor, the structure of the apparatus has been complicated and the cost of the apparatus has been expensive.

SUMMARY OF THE INVENTION

In view of the foregoing disadvantages, it is an object of the present invention to provide a disk recording apparatus which is simple in structure and inexpensive in cost, yet provides rotational control of the spindle motor.

In order to achieve the above-mentioned and other objects, the invention provides an improved disk recording apparatus which comprises: a spindle motor for rotating a disk; a pickup for reproducing an RF signal recorded on the disk; a detection circuit for detecting and outputting an RF signal reproduced by the pickup; a comparison circuit for comparing an output of the detection circuit with, a reference voltage and providing a comparison output; and a servo circuit for selectively accelerating or decelerating the spindle motor in accordance with the comparison output.

In operation, the pickup reproduces the RF signal recorded on the disk which is being rotated by the spindle motor. The RF signal reproduced by the pickup is detected by the detection circuit and the output of the detection circuit is inputted to the comparison circuit for comparison with a reference voltage. In response to the output from the comparison circuit, the servo circuit accelerates or decelerates the spindle motor.

BRIEF DESCRIPTION OF THE DRAWINGS

The various objects and features of the present invention now will be describe-d in detail with reference to the accompanying drawings in which:

FIG. 1 is a circuit diagram showing a conventional disk reproducing apparatus;

FIGS. 2A, 2B, 2C, 3A, 3B, 3C, and 4A, 4B, 4C are waveform diagrams for description of the operation of the circuit shown in FIG. 1:

DETAILED DESCRIPTION OF THE PREFERRED EMBODIMENTS

Figure 5:
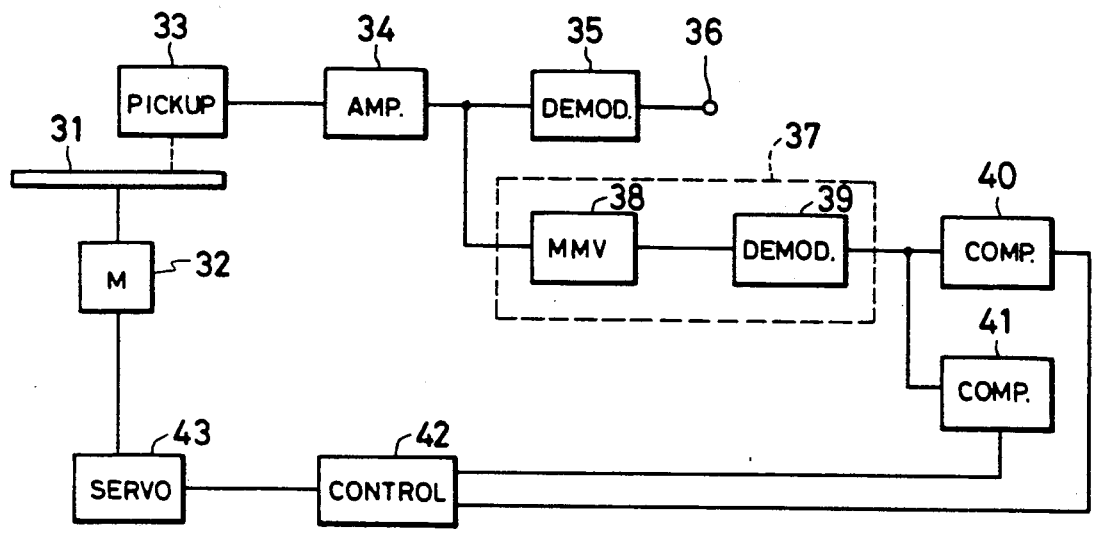
FIG. 5 is a block diagram showing a disk reproducing apparatus according to the present invention.
Figure 6:
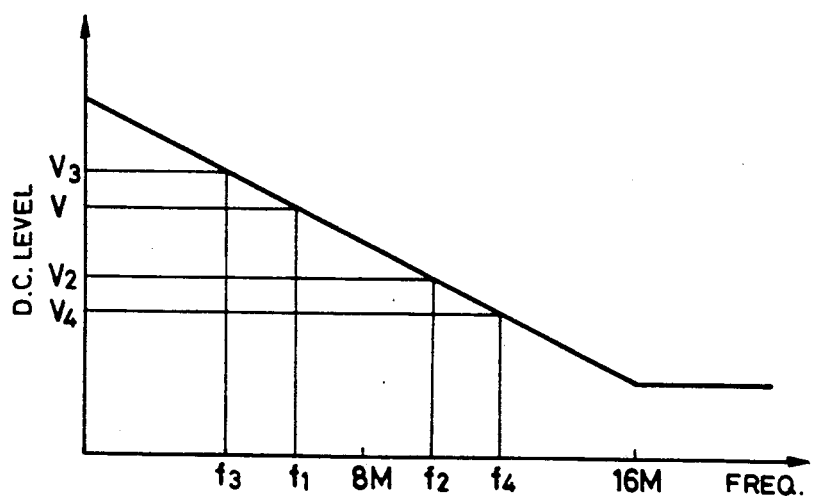
FIG. 6 is a graphical representation of a characteristic of a demodulation circuit included in the block diagram in FIG. 5.

A preferred embodiment of the invention now will be described with reference to FIGS. 5 and 6. FIG. 5 is a block diagram showing a video disk player. A disk 31 is rotated by a spindle motor 32, and a pickup 33 reproduces the signal recorded on the disk 31. The RF signal reproduced and outputted by the pickup 33 is amplified by an amplifier circuit 34 and then is applied to a demodulation circuit 35, in which the RF signal is subjected to frequency demodulation. The demodulated signal is outputted through a terminal 36 to a CRT (not shown) and is displayed thereon. The output of the amplifier circuit 34 is further applied to a detection circuit 37 comprised of a monostable multivibrator (MMV) 38 and a demodulation circuit 39. The MMV 38 is triggered to output a constant duration pulse in response to the rising edge or falling edge of the RF signal.

The output pulses of the multivibrator 38 are supplied to the demodulation circuit 39 which, for example, may comprise a frequency demodulation circuit, such as a multiplier. An input versus output characteristic of the demodulation circuit 39 is exemplified in FIG. 6. As is apparent from FIG. 6, as the frequency of the input signal increases, the level of the signal output by the demodulation circuit 39 is lowered. When the frequency of the input signal is in a range between $f_1$ and $f_4$, the voltage of the output signal is in a range between $V_1$ and $V_4$.

The output of the demodulation circuit 39 is inputted to comparison circuits 40 and 41 whose respective inputs are compared with the respective reference voltages. The comparison circuit 40 compares a reference voltage of $V_1$ with $V_3$ and the comparison circuit 41 compares a reference voltage of $V_4$ with $V_2$. The voltages $V_1$ and $V_4$ are related to hysteresis characteristics of the comparison circuits 40 and 41, respectively, as will be explained below.

Immediately after the disk 31 has started to rotate, the rotational speed has not yet reached its peak value. At this time, the frequency of the output pulse of the monostable multivibrator 38 is less than $f_1$, and thus the output voltage of the demodulation circuit 39 is greater than the reference voltage $V_1$. The comparison circuit 40 outputs, for example, a high level signal. In response to the high level signal outputted from the comparison circuit 40, a control circuit 42, which includes a microprocessor, controls a servo circuit 43 so that a predetermined DC current is supplied to the spindle motor 32 to accelerate it.

Because of the acceleration of the spindle motor 32, the output voltage of the demodulation circuit 39 is lowered. When the output voltage of the demodulation circuit 39 falls below the reference voltage $V_1$, the output of the comparison circuit 40 becomes low. At this time, the control circuit 42 controls the servo circuit 43 so as to stop the acceleration mode and simultaneously closes a loop switch (not shown) of a spindle servo loop so as to switch to a servo mode. Consequently, the disk 31 is rotated at the predetermined standard speed.

Even if the number of rotations of the disk should be lowered to be other than the standard speed, so that the output voltage of the demodulation circuit 39 exceeds the reference voltage $V_1$, the comparison circuit 40 does not immediately output the high level signal, because the comparison circuit 40 is provided with a hysteresis characteristic. When the output voltage of the demodulation circuit 39 exceeds the reference voltage $V_3$ ($V_3$ being larger than $V_1$), the output of the comparison son circuit 40 is again raised to the high level, whereupon the loop switch of the spindle servo is opened and the acceleration mode is again carried out.

If, for some reason, the number of rotations (rotational speed) of the spindle motor 32 is abnormally increased, so that the output voltage of the demodulation circuit 39 falls below the reference voltage $V_4$, the comparison circuit 41 produces a high level signal. In response thereto, the control circuit 42 controls the servo circuit 43 to open the loop switch and interrupt the servo mode. Further, a current of opposite polarity is applied to the spindle motor 32 to reduce the number of rotations (i.e. decelerate the motor). The comparison circuit 41, which is also provided with a hysteresis characteristic, outputs a low level signal when the output voltage of the demodulation circuit 39 exceeds the reference voltage $V_2$ (which is smaller than $V_1$ but larger than $V_4$) as a result of deceleration. At this point, the control circuit 42 stops the deceleration and closes the loop switch to enter the servo mode.

Because the present invention operates by deriving velocity information directly from a disk surface, the above-described operations are equally performable for both the CAV disk and the CLV disk. Thus, according to the present invention, it is not necessary to perform different operations for CAV disks and CLV disks, so that the reproducing apparatus can be simpler in structure and less expensive.

What is claimed is:

1. A disk recording and reproducing apparatus comprising:
    means for rotating a disk on which at least a frequency modulated video signal is recorded;
    pickup means for reproducing at least the frequency modulated video signal recorded on the disk;
    means for detecting at least the frequency modulated video signal reproduced by said pickup means, said detecting means including means for demodulating at least said frequency modulated video signal, said detecting means providing a demodulated video signal level accordingly;
    means for comparing the demodulated video signal level with at least a first reference value and providing a comparison output; and
    means for selectively accelerating and decelerating said rotating means in accordance with the comparison output.

2. A disk recording and reproducing apparatus as recited in claim 1, wherein said video signal level has a lower level as a frequency of the detected frequency modulated video signal increases.

3. A disk recording and reproducing apparatus as recited in claim 2, wherein said detecting means comprises a monostable multivibrator and a demodulator.

4. A disk recording and reproducing apparatus as recited in claim 1, wherein said disk is one of a constant linear velocity disk and a constant angular velocity disk.

5. A disk recording and reproducing apparatus comprising:
   means for rotating a disk on which at least a frequency modulated video signal is recorded;
   pickup means for reproducing at least the frequency modulated video signal recorded on the disk;
   means for detecting at least the frequency modulated video signal reproduced by said pickup means and providing a detection output accordingly;
   means for comparing the detection output with at least a first reference value and providing a comparison output, wherein said comparing means comprises first and second comparators which compare said detection output with respective first and second reference values, wherein said comparison output comprises respective outputs of said first and second comparators; and
   means for selectively accelerating and decelerating said rotating means in accordance with the comparison output, said rotating means being accelerated in accordance with an output of said first comparator, and being decelerated in accordance with an output of said second comparator.

6. A disk recording and reproducing apparatus as recited in claim 5, wherein said first and second comparators have respective hysteresis characteristics, such that selective acceleration and deceleration of said rotating means is not carried out until said detection output differs from one of said first and second reference values by more than a predetermined amount.

* * * * *